United States Patent [19]

Coker et al.

[11] Patent Number: 5,168,413
[45] Date of Patent: Dec. 1, 1992

[54] TRANSDUCER HEAD FLYING HEIGHT MONITORING METHODS AND APPARATUS FOR DISK DRIVE SYSTEM

[75] Inventors: Jonathan D. Coker; Richard L. Galbraith; Paul P. Howard; Gregory J. Kerwin; Gordon J. Smith, all of Rochester, Minn.

[73] Assignee: IBM Corporation, Armonk, N.Y.

[21] Appl. No.: 621,010

[22] Filed: Nov. 30, 1990

[51] Int. Cl.$^5$ .......................... G11B 5/60; G11B 21/02
[52] U.S. Cl. ........................................ 360/137; 360/75
[58] Field of Search .................. 360/137, 75, 102, 103

[56] References Cited

U.S. PATENT DOCUMENTS

| | | | |
|---|---|---|---|
| 4,006,294 | 2/1977 | Canino | 360/103 |
| 4,624,564 | 11/1986 | Dahlgren | 360/103 |
| 4,777,544 | 10/1988 | Brown et al. | 360/75 |
| 4,814,907 | 3/1989 | Goor | 360/75 |
| 4,841,389 | 6/1989 | Hoyt et al. | 360/75 |
| 4,843,502 | 6/1989 | Tagawa | 360/103 X |
| 4,853,810 | 8/1989 | Pohl et al. | 360/103 |
| 4,866,533 | 9/1989 | Nagashima | 358/443 |
| 4,954,904 | 9/1990 | Goor | 360/75 |

OTHER PUBLICATIONS

G. J. Kerwin, Insitu Measurement of Flyheight Variations in Magnetic Storage Devices through the Use of Sample Margin Signal Processing Techniques, Sep. 19, 1990, pp. 1-3.

Primary Examiner—David J. Severin

[57] ABSTRACT

A method and apparatus are provided for measuring flying height changes of a transducer head relative to a disk surface of a rotating disk in a disk file. A predetermined pattern is written on at least one predetermined region of the disk file. The predetermined region is normally not rewritten during operation of the disk file. At least one readback signal is sensed from at least one predetermined region of the disk surface. A plurality of sample values are identified corresponding to each readback signal. A change in the flying height is calculated utilizing the identified sample values. A frequency equalization number K can be utilized to calculate the magnitude and sign of the flying height change. Alternatively, real-time digital analysis of a predetermined pattern written on at least one predetermined region of the disk surface can be utilized to calculate the magnitude and sign of the flying height change.

18 Claims, 5 Drawing Sheets

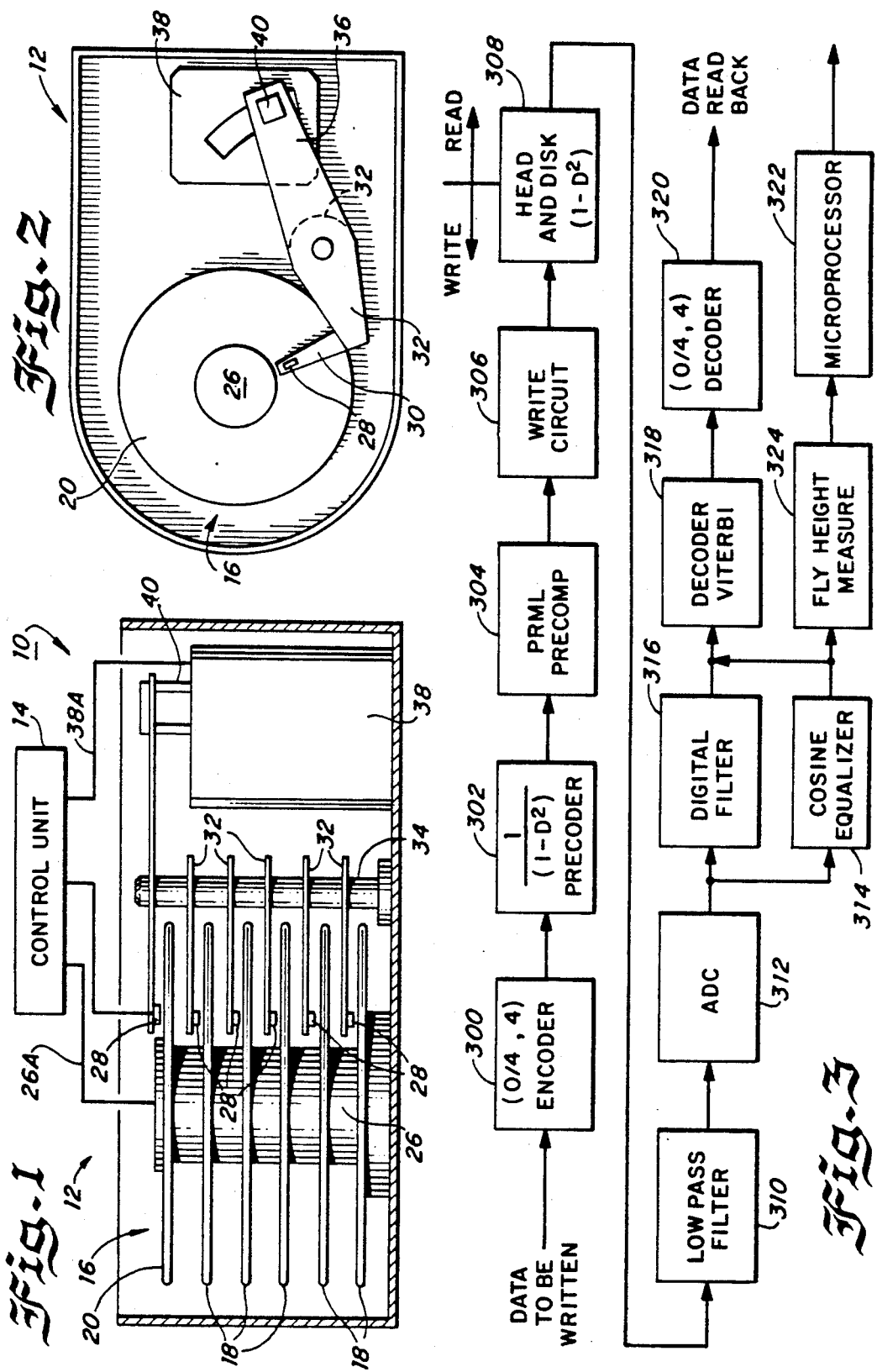

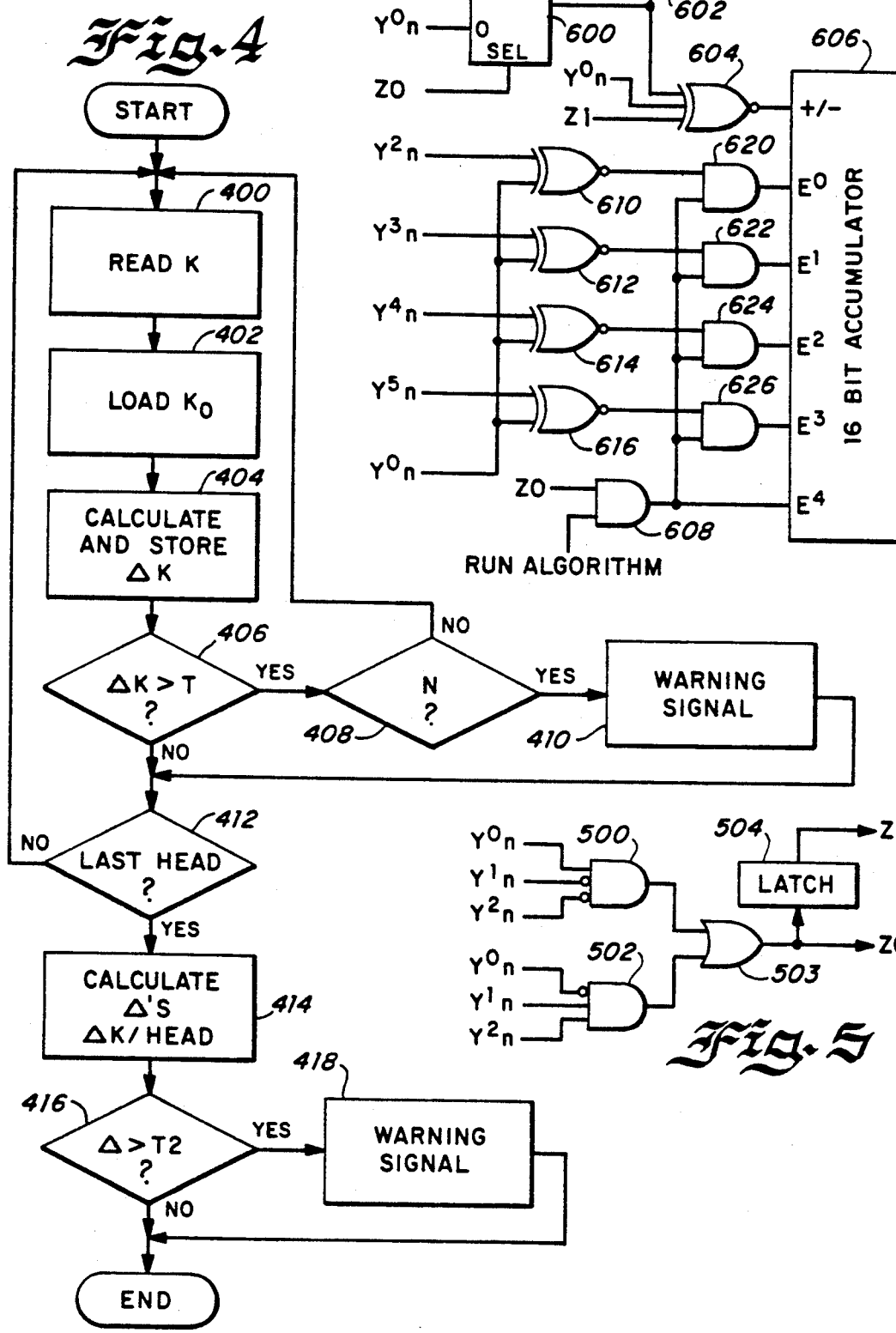

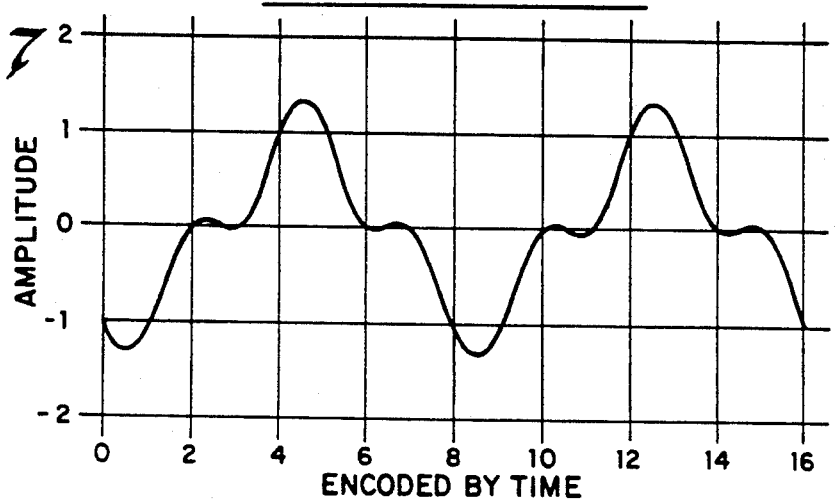
Fig. 7 — COMPUTED WAVEFORM
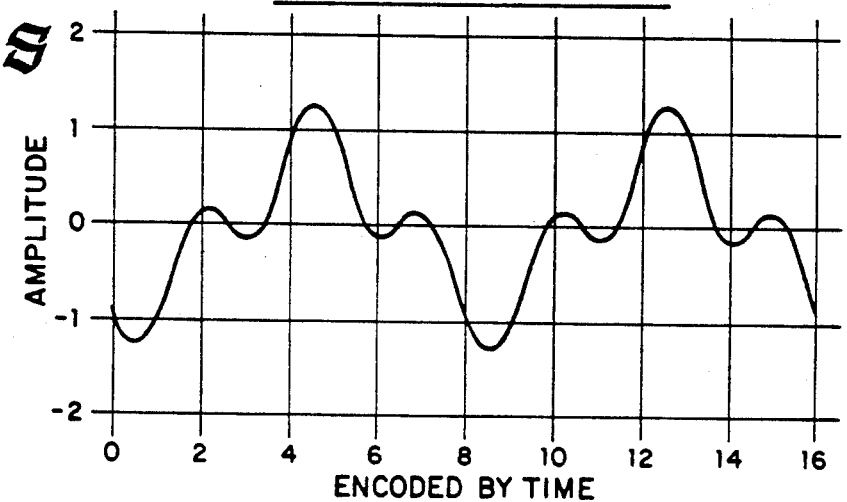
Fig. 8 — COMPUTED WAVEFORM
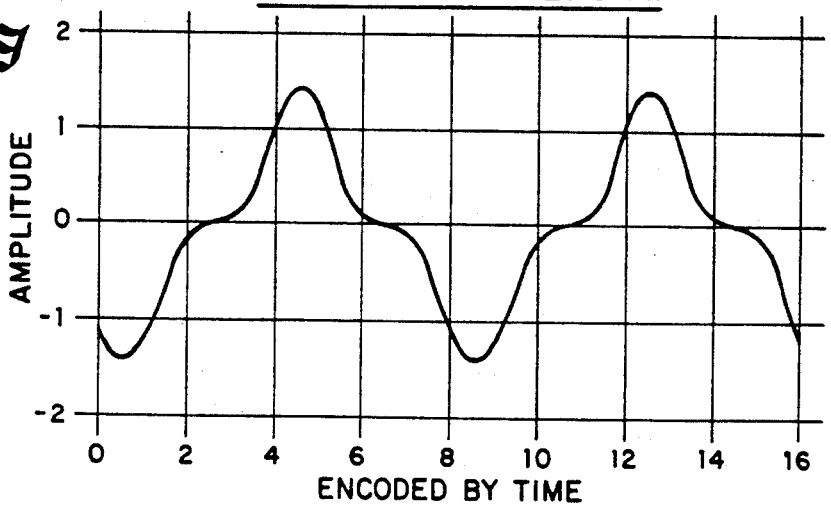
Fig. 9 — COMPUTED WAVEFORM

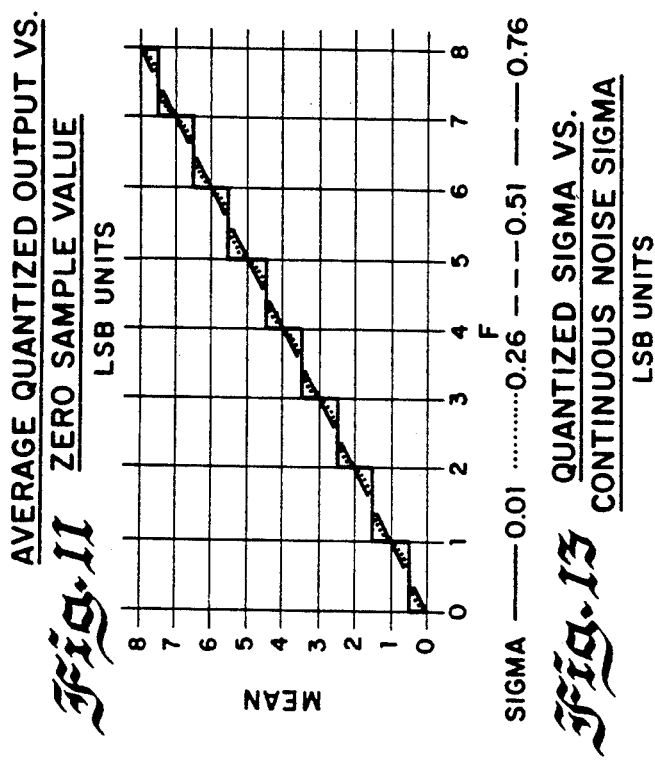
Fig. 11 AVERAGE QUANTIZED OUTPUT VS. ZERO SAMPLE VALUE
LSB UNITS
SIGMA —— 0.01 ······ 0.26 ––– 0.51 — — 0.76
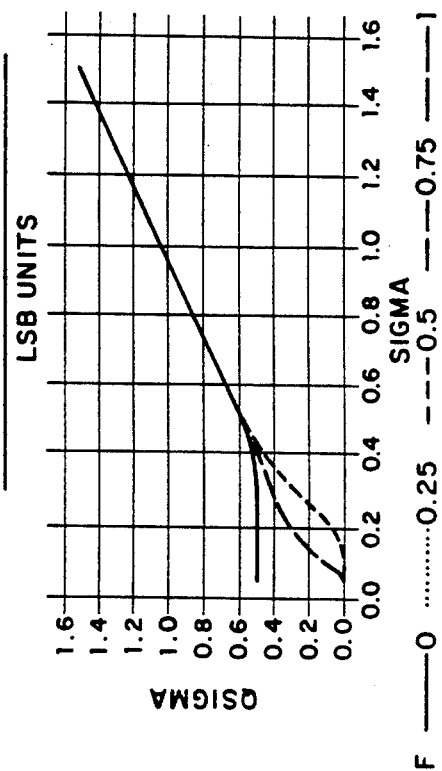
Fig. 13 QUANTIZED SIGMA VS. CONTINUOUS NOISE SIGMA
LSB UNITS
F —— 0 ······ 0.25 ––– 0.5 — — 0.75
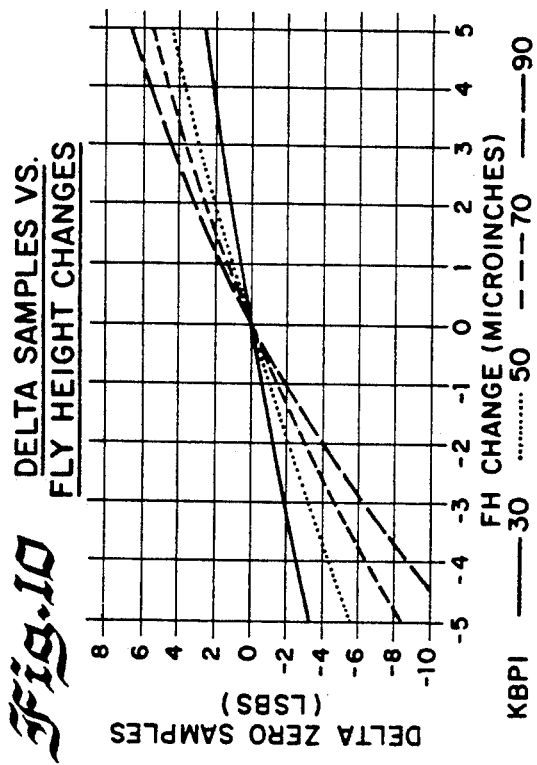
Fig. 10 DELTA SAMPLES VS. FLY HEIGHT CHANGES
FH CHANGE (MICROINCHES)
KBPI —— 30 ······ 50 ––– 70 — — 90
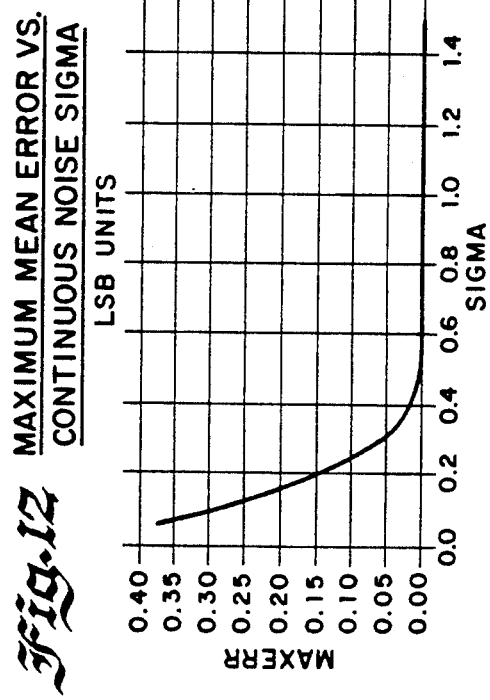
Fig. 12 MAXIMUM MEAN ERROR VS. CONTINUOUS NOISE SIGMA
LSB UNITS

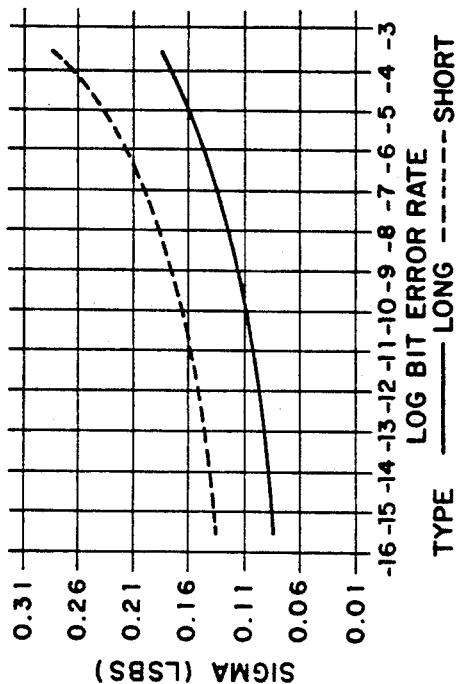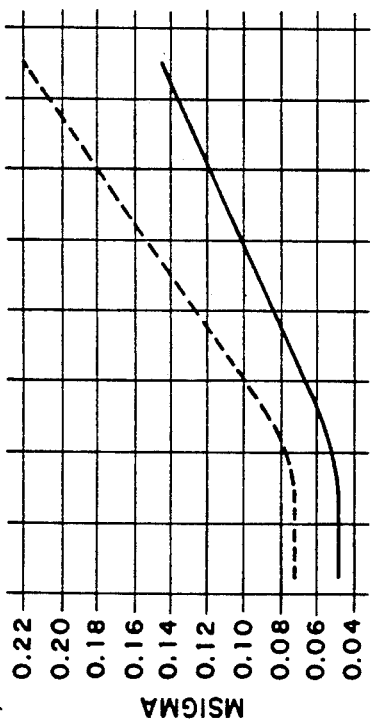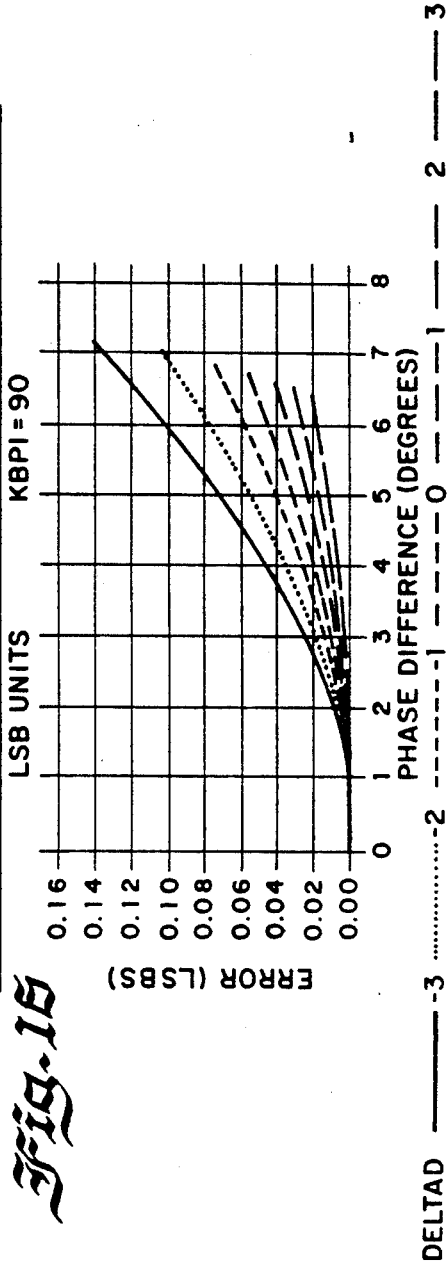

TRANSDUCER HEAD FLYING HEIGHT MONITORING METHODS AND APPARATUS FOR DISK DRIVE SYSTEM

BACKGROUND OF THE INVENTION

1. Field of the Invention

The present invention relates generally to a direct access storage device (DASD) of the type in which a read/write transducer head flies above a medium surface when the medium is moving at operating speed, and more particularly to methods for monitoring flying height changes of a transducer head in a disk drive data storage system and apparatus for performing the methods.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A slider supports one or more magnetic heads. The slider is lightly biased to cause the heads to move toward the recording surface when the disk is stationary; but as the disk is brought up to operating speed, an air bearing is generated which moves each slider and hence the heads away from the recording surface toward a preselected flying height. Achievement of a higher data density on magnetic disks has imposed a requirement to read and write more data on narrower tracks located on the disk surfaces and with increasingly narrow transducing gaps.

Flying height of the transducer head is critical for mechanical and magnetic performance. Transducer heads flying too high perform poorly magnetically, for example, providing a readback signal with a reduced amplitude, a reduced signal to noise ratio and a reduced resolution for bit detection. Transducer heads flying too low are more likely to pick up contamination from the disk that will lead to smears on the heads and to an increase of the hazard of head crashes.

U.S. Pat. No. 4,841,389 discloses a magnetic transducer crash anticipation and response method and apparatus based upon contemporaneous readback measurement indicative of head overwrite efficiency. A signal is written at a frequency $f_l$ on a predetermined dedicated track, read back, then overwritten at a higher frequency $f_h$. The ratios of the readback signals is used to initiate a desired control operation when the ratio denotes that the flying height is too low.

U.S. Pat. No. 4,777,544 discloses a method and apparatus for insitu measurement of head/recording medium clearance or flying height. The method and apparatus produce relative motion between the magnetic transducer and a magnetic recording medium at a first velocity so that the resulting air bearing positions the magnetic transducer slider at a first flying height from the magnetic medium. A single signal of constant periodicity is written over a predetermined area of the recording medium by the magnetic transducer, and a readback signal is sensed from the predetermined area of the recording medium to produce a first signal. The flying height of the magnetic transducer slider is lowered to substantially zero, and a readback signal is sensed at the lowered flying height to produce a second signal. The first flying height is then calculated as the ratio, expressed in decibels, of the first and second signals times the wavelength divided by a constant. In an alternate embodiment, a plurality of signals are recorded and readback signals are simultaneously sensed at two separate wavelengths. In a further embodiment, a signal is recorded which has a spectral content comprising a plurality of different frequencies, and readback signals are simultaneously sensed at two separate wavelengths.

Disadvantages of many of the above-described and other known arrangements include both the additional hardware and time required for performing the flying height monitoring methods. Further, it is desirable to accurately measure both increases and decreases in flying height.

SUMMARY OF THE INVENTION

A principal object of the present invention is to provide improved methods for monitoring flying height changes of a transducer head in a disk drive data storage system. Other objects are to provide such improved flying height monitoring methods substantially without negative effects and that overcome many of the disadvantages of prior art arrangements.

In brief, the objects and advantages of the present invention are achieved by a method and apparatus for measuring flying height changes of a transducer head relative to a disk surface of a rotating disk in a disk file. A readback signal is sensed from at least one predetermined region of the disk surface. At least one sample value is identified responsive to sampling the readback signal. A change in the flying height is calculated responsive to identifying the at least one sample value.

In accordance with the invention, a frequency equalization number K can be utilized to calculate the magnitude and sign of the flying height change. Alternatively, real-time digital analysis of a predetermined pattern written on at least one predetermined region of the disk surface can be utilized to calculate the magnitude and sign of the flying height change.

BRIEF DESCRIPTION OF THE DRAWINGS

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 3 is a diagram illustrating apparatus for carrying out the flying height monitoring according to methods of the present invention in the data storage disk file of FIG. 1;

FIG. 4 is a flow chart illustrating logical steps performed by a microprocessor of the apparatus of FIG. 3 for carrying out a first flying height monitoring method of the present invention;

FIGS. 5 and 6 are logic diagrams of the flying height monitoring circuit of FIG. 3 for carrying out an alternative method of the present invention;

FIGS. 7, 8 and 9 are graphs illustrating readback signals with flying height deviations of the flying height measurement circuit of FIGS. 5 and 6;

FIG. 10 is a chart illustrating relationships between delta zero sample values and flying height changes of the flying height measurement circuit of FIGS. 5 and 6; and FIGS. 11–16 are charts illustrating measurement sensitivities relative to various error sources of the flying height measurement circuit of FIGS. 5 and 6.

DETAILED DESCRIPTION OF THE PREFERRED EMBODIMENTS

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads 40 in registration with data cylinders to be followed. The VCM is movable within a fixed magnetic field, and the direction and velocity of the coil movement is controlled by the current supplied.

During operation of the disk file 10, the rotation of the disks 18 generates an air bearing between the heads 28 and the disk surfaces 20. This air bearing thus counterbalances the slight spring force of the suspensions 30 and supports the transducer heads 28 off the disk surfaces during operation.

The various components of the disk file 10 are controlled in operation by signals generated by control unit 34 such as motor control signals on line 26A and position control signals on line 38A. In accordance with the methods of the present invention, the transducers 28 are positioned to read from a predetermined region on the disk surface 20 to obtain a readback signal. Preferably, the predetermined area is one which is normally not rewritten during operation of the disk file 10.

Referring now to FIG. 3, there is shown a block diagram of a partial response maximum likelihood (PRML) recording channel available in the disk file 10 for carrying out the flying height monitoring methods of the invention. The PRML recording channel uses class-IV partial-response (PR) signals accomplished by a PR-IV filter function. Data to be written is applied to an encoder 300 for providing a modulation coded output having predefined run length constraints, such as for the minimum and maximum number of consecutive zeros and the maximum run length of zeros in the even and odd recorded sequences in the overall recorded sequence. A precoder 302 follows the encoder 300 described by a $1/(1-D^2)$ operation where D is a unit delay operator. A PRML precomp 304 coupled to the precoder 302 provides a modulated binary pulse signal applied to a write circuit 306 that provides the modulated write current for writing to the disk surface. An analog read signal is obtained at head and disk block 308 described by the $(1-D^2)$ operation. The read signal is applied to a lowpass filter 310 which may or may not provide equalization for class IV response. The filtered read signal is converted to digital form by an analog to digital converter (ADC) 312 that provides 64 possible 6-bit sampled values.

In the monitoring methods of the invention, the heads 28 are positioned to read from at least one predetermined area of the disk surface 20 to obtain a readback signal. Multiple readback signals can be obtained from specific selected reference tracks or sectors. In a first embodiment for carrying out a first flying height monitoring method of the invention, the 6-bit samples of the ADC 312 are applied to a cosine equalizer 314 that provides an adaptive frequency adjustment function. Alternatively, the 6-bit samples of the ADC 312 are applied to a digital filter 316, such as a 10 tap finite impulse response (FIR) digital filter. Typically either the equalized signal or the filtered signal from the cosine equalizer 314 or the digital filter 316, respectively is applied to a Viterbi decoder 318 coupled to a decoder 320 to complete the maximum-likelihood (ML) detection process for data read back.

In the first, simplest flying height monitoring method of the invention, a number K, representative of the frequency adjustment provided by the cosine equalizer 314 for each head 28, is available after a read to a microprocessor 322 to determine if frequency response changes have occurred. The frequency adjustment number K is available to the microprocessor 322 via a register represented by a flying height measure block 324. An initial frequency adjustment value $K_0$ is saved for each head identified from a harmonic ratio flying height (HRF) clearance test at the time of manufacture of the data storage disk file 10. A servo processor present in the control unit 14 can be used to perform the monitoring operations by microprocessor 322.

Referring to FIG. 4, the first adaptive-K flying height monitoring method starts with the microprocessor 322 reading the frequency adjustment value K returned for each head read as indicated at block 400. The initial frequency adjustment value $K_0$ is loaded as indicated at block 402 and a change between the initial frequency adjustment value $K_0$ and the current value K is calculated and stored indicated at block 404. The calculated change value is compared with a first threshold value T. These sequential steps can be repeated until multiple samples N of the frequency adjustment value K are processed as indicated at decision block 408. A warning signal is generated by the microprocessor 322 when the calculated change value is greater than the first threshold value T for one or more samples of the frequency adjustment value K indicated at block 410. The above-described sequential operations are repeated until flying height data for the last head in the disk file 10 has been acquired as indicated at a decision block 412. Next, differences in the flying height changes for the multiple heads are calculated as indicated at block 414. The calculated differences are then compared with a second threshold value T2 to identify significant changes in the flying height for one head as compared to the remaining heads in the disk file 10 as indicated at decision block 416. A warning signal is generated by the microprocessor 322 when a calculated difference value is greater than the second threshold value T2 as indicated at block 418.

In a second preferred flying height monitoring method of the invention, real-time digital sampling of the 6-bit sampled values from the digital filter 316 are utilized for monitoring changes in the flying height responsive to a control signal RUN ALGORITHM generated by the microprocessor 322. Logic circuitry 324 for performing the readback digital sampling flying height monitoring method of the invention is illustrated in FIGS. 5 and 6. A predetermined encoded pattern 11001100 is written to at least one predetermined region of the disk surface 20. Analysis of data samples read back from the predetermined encoded pattern 11001100 is used to identify an average deviation value corresponding to flying height changes in microinches.

Referring initially to FIGS. 7-9, FIG. 7 shows the readback signal using the selected predetermined encoded pattern 11001100 for a perfectly equalized recording system 10. FIG. 8 shows how the introduction of misequalization of a type corresponding to a decrease in flying height affects the sample values. FIG. 9 illustrates the effect of a positive change in flying height where the pulse broadens and the zero samples on the pulse sides increase.

An equalized signal with linear-phase flying height frequency response changes can be expressed, using Wallace's equations as follows:

$$f(t) \propto (1 + \sqrt{2}) e^{-k\frac{\pi}{4}} \cos\left(\frac{\pi}{4} t\right) + e^{-3k\frac{\pi}{4}} \cos\left(\frac{3\pi}{4} t\right)$$

where k corresponds to a flying height change, measured in bit length units. When the system is not equalized at the measurement time, then before and after values are needed to calculate an absolute flying height change. For this reason, two readings are employed in the digital readback sampling flying height monitoring method of the invention.

Referring now to FIGS. 5 and 6, logic circuitry 324 for performing the digital readback sampling flying height monitoring method of the invention is illustrated. FIG. 5 provides an example of logic circuitry for providing a binary signal Z0 used for taking zero samples when the method is initiated by a control signal RUN ALGORITHM. Binary signal Z0 is set to zero with ±1 trinary samples and set to one with a 0 trinary sample. The 6-bit sampled values from the digital filter 316 are represented by $Y^0Y^1Y^2Y^3Y^4Y^5$ corresponding to 64 levels. $Y^0$ represents the most significant bit (MSB) and $Y^5$ represents the least significant bit (LSB). $Y^0Y^1Y^2Y^3Y^4Y^5$ (0000000) corresponds to $-31.5$ LSB's, $Y^0Y^1Y^2Y^3Y^4Y^5$ (011111) corresponds to $-0.5$ LSB'S, $Y^0Y^1Y^2Y^3Y^4Y^5$ (100000) corresponds to $+0.5$ LSB'S and $Y^0Y^1Y^2Y^3Y^4Y^5$ (111111) corresponds to $+31.5$ LSB's Binary signal Z0 is obtained with the $Y^0$ sample bit and inverted $Y^1$, $Y^2$ sample bits are applied to a first AND gate 500 with an inverted $Y^0$ sample bit and $Y^1$, $Y^2$ sample bits applied to a second AND gate 502. An OR gate 503 is coupled to the AND gates 500 and 502 to provide the binary signal Z0. The binary signal Z0 is applied to a latch 504 to provide a one-time-old binary signal Z1.

Polarity or the direction of flying height changes is identified by a multiplexer 600 and a latch 602 arranged together as a slope detector and a 3-input exclusive-or (XOR) 604. The slope multiplexer output of multiplexer 600, the $Y^0$ sample bit and the binary signal Z1 are applied to the input of XOR 604. The polarity representative output of the XOR 604 is applied to +ADD/−SUB input of an accumulator 606.

With the control signal RUN ALGORITHM and the Z0 set high or one, the zero sampled value bits $Y^2$-$Y^5$ are shifted to the $E^0$-$E^3$ inputs of accumulator 606 via XOR gates 610, 612, 614 and 616 and AND gates 620, 622, 624 and 626. The difference between adjacent zero samples is taken in order to null any DC offset and minimize phase misequalization as described with respect to FIG. 16. A logical value is applied to the $E^4$ input of accumulator 606 corresponding to 0.5 LSB error.

The gain loop of the PR channel constrains the amplitude of the waveform such that $f(-0.5)+f(0.5)=2$. FIG. 10 illustrates delta samples relative to flying height changes for various linear densities where the delta value between zero samples can be calculated by:

$$\delta(k) = \frac{2(1 - e^{-k\frac{\pi}{2}})}{\cot\left(\frac{\pi}{8}\right) + \tan\left(\frac{\pi}{8}\right)e^{-k\frac{\pi}{2}}}$$

The delta value is a function of the linear density and is most sensitive at high linear density. The delta value is not a function of the original absolute flying height. The sensitivity of the monitoring method is about 1 LSB per microinch at a linear density of 45 KBPI; the sensitivity is about 2 LSB's per microinch at 90 KBPI. The repeatability of the monitoring method is a small fraction of an LSB unit so that repeatable detection of sub-microinch flying height changes is provided.

Random noise will generate variation in the measurement. FIG. 11 shows the mean output of the ADC with a continuously variable input f and the mean output of the ADC in the presence of random noise of various standard deviations. FIG. 12 shows the maximum mean error due to quantization as a function of the standard deviation of a continuous random voltage at the input of the ADC 316. FIG. 13 shows the output standard deviation as a function of the input standard deviation, for several mean input values. For input sigma $\sigma_i > 0.5$, the output standard deviation can be represented by:

$$\sigma_0 = \frac{\sigma_i}{N}$$

where N is the number of pertinent sample values. FIG. 14 shows the measurement of $3\sigma$ value versus small values of the input standard deviation for the two integration lengths of 864 bits and 2016 bits. FIG. 15 shows the result of converting the input standard deviation value to its theoretical error rate for a worst case. Typically, the measurement standard deviation will be below 0.1 LSB units. Thus at 90 KBPI, the measurement 3 sigma, due to random noise will be below 0.15 microinches.

Because the predetermined pattern selected of (11001100) contains only two harmonics, only relative magnitude misequalization and relative phase misequalization are possible. Magnitude misequalization causes extra error in determining an absolute change with only one measurement so that the effects of magnitude misequalization are nulled using the before and after measurements. A general waveform can be represented as:

$$f(t) = G\left\{K_1\cos\left(\frac{\pi}{4}t + \phi_1\right) + K_2\cos\left(\frac{3\pi}{4}t + \phi_2\right)\right\}$$

Application of timing gain and timing loop considerations of this pattern yields the following constraints:

$$f(0.5)+f(1.5)+f(2.5)+f(3.5)=0$$

$$f(-0.5)+f(-0.5)=2$$

Application of these constraints to the above equation f(t) results in the following relationships for the phase angles $\phi_1$ and $\phi_2$, and the gain G:

$$\sin(\phi_1) = (2\sqrt{2} - 3) e^{-k\frac{\pi}{2}} \sin(\phi_2)$$

$$\frac{1}{G} = (1 + \sqrt{2}) e^{k\frac{\pi}{4}} \cos\left(\frac{\pi}{8}\right)\cos(\phi_1) + e^{k\frac{3\pi}{4}} \cos\left(\frac{3\pi}{8}\right)\cos(\phi_2)$$

The value f(1.5) (the "zero" value) deviates significantly from zero even for relatively small phase differences. For this reason, the method was designed to take the difference between adjacent "zero" samples. In this manner, the interaction of the timing loop cancels, to first order, effect of phase misequalization. FIG. 16 shows the effect of the phase difference $\phi_2-\phi_1$ on the mean delta sample output, for various flying height changes. The level of linear phase deviation is expected to be well below 3 degrees so that phase misequalization will have negligible impact on the measurement.

While the invention has been described with reference to details of the illustrated embodiments, these details are not intended to limit the scope of the invention as defined in the appended claims.

We claim:

1. A method for measuring flying height changes of a transducer head relative to a disk surface of a rotating disk in a disk file comprising the steps of:
   writing a predetermined pattern on at least one predetermined region of the disk surface, said at least one predetermined region being normally not rewritten during operation of the disk file;
   sensing at least one readback signal by reading back said predetermined pattern from said at least one predetermined region of the disk surface;
   identifying a plurality of sample values corresponding to said readback signal; and
   calculating a change in the flying height utilizing said identified plurality of sample values.

2. A method as recited in claim 1 further comprising the step of initiating a warning signal when said calculating flying height change exceeds a preselected level.

3. A method as recited in claim 1 wherein said disk file includes a plurality of said transducer heads and further comprising the step of initiating a warning signal when said calculated flying height change for any one transducer head differs from said calculated flying height change for the other transducers heads by a predetermined amount.

4. A method as recited in claim 1 wherein said step of writing said predetermined pattern comprises the step of writing an 8-bit repeating pattern.

5. A method as recited in claim 1 wherein said step of writing said predetermined pattern includes the step of writing 11001100.

6. A method as recited in claim 1 further comprising the steps of:
   storing a first initial value corresponding to a first flying height; and wherein said step of calculating a change in flying height includes the step of:
   comparing said stored first initial value with said identified plurality of sample values to identify a magnitude and sign of the flying height change.

7. A method as recited in claim 6 wherein each of said step of storing said first initial value and identifying a plurality of sample values includes the step of:
   identifying a frequency equalization number Ko or K corresponding to said readback signal.

8. A method as recited in claim 7 wherein said step of identifying said frequency equalization number Ko or K includes the step of:
   identifying an adaptive frequency adjustment function normally applied to said readback signal during operation of the disk file.

9. A method as recited in claim 7 wherein said step of identifying a plurality of values corresponding to said readback signal includes the steps of:
   identifying repetitive sample values; and
   calculating an average frequency equalization number K for comparing with said stored equalization initial value Ko.

10. A method as recited in claim 1 wherein said step of identifying a plurality of sample values includes the step of:
    real-time digital sampling of said readback signal corresponding to said predetermined pattern.

11. A method as recited in claim 10 wherein said step of real-time digital sampling includes the step of:
    real-time digital sampling of adjacent zero samples.

12. A method as recited in claim 11 wherein said step of real-time digital sampling of adjacent zero samples includes the step of digital threshold detecting relative to an expected trinary 0 level.

13. A method as recited in claim 11 wherein said step of calculating a change in the flying height includes the step of:
    identifying a difference between adjacent zero samples to identify a magnitude and sign of the flying height change.

14. A method as recited in claim 13 further includes the step of:
    averaging said identified difference between adjacent zero samples over a predefined time period for providing an average deviation; and
    calculating said change in the flying height responsive to said average deviation.

15. Apparatus for measuring flying height changes of a transducer head relative to a disk surface of a rotating disk in a partial-response maximum-likelihood (PRML) data channel in a disk file comprising:

means for writing a predetermined pattern on at least one predetermined region of the disk surface, said at least one predetermined region being normally not rewritten during operation of the disk file;

means for sensing at least one readback signal by reading back said predetermined pattern from said at least one predetermined region of the disk surface;

means for identifying a plurality of sample values;

means for calculating a change in the flying height utilizing said identified plurality of sample values.

16. Apparatus as recited in claim 15 wherein said means for identifying a plurality of sample values corresponding to said readback signal include means for real-time digital sampling of said readback signal corresponding to said predetermined pattern.

17. A method for measuring flying height changes of a transducer head relative to a disk surface of a rotating disk in a partial-response maximum-likelihood (PRML) data channel in a disk file comprising the steps of:

writing a predetermined pattern on at least one predetermined region of the disk surface, said at least one predetermined region being normally not rewritten during operation of the disk file;

sensing at least one readback signal by reading back said predetermined pattern from said at least one predetermined region of the disk surface;

real-time digital sampling of said readback signal for identifying adjacent sample values; and calculating a change in the flying height utilizing said identified adjacent sample values.

18. A method as recited in claim 17 wherein said step of writing said predetermined pattern includes the step of writing 11001100 and wherein said step of identifying said adjacent sample values includes the step of identifying adjacent zero sample values.

* * * * *